United States Patent [19]
Ashley

[11] Patent Number: 5,754,384
[45] Date of Patent: May 19, 1998

[54] OVERCURRENT PROTECTION CIRCUITRY FOR NON-ISOLATED BATTERY DISCHARGE CONTROLLER

[75] Inventor: Christopher R. Ashley, Redondo Beach, Calif.

[73] Assignee: Hughes Electronics Corporation, El Segundo, Calif.

[21] Appl. No.: 707,842

[22] Filed: Sep. 9, 1996

[51] Int. Cl.$^6$ .................................................. H02H 3/00
[52] U.S. Cl. .................................................. 361/93; 361/126
[58] Field of Search ................................ 361/2, 4, 5, 7, 361/8, 9, 10, 13, 54–60, 63, 87, 93, 111, 118, 119, 126; 323/282

[56] References Cited

U.S. PATENT DOCUMENTS

| | | | |
|---|---|---|---|
| 4,847,719 | 7/1989 | Cook et al. | 361/13 |
| 5,122,728 | 6/1992 | Ashley | 323/282 |
| 5,504,418 | 4/1996 | Ashley | 323/282 |
| 5,631,794 | 5/1997 | Yang | 361/10 |

*Primary Examiner*—Jeffrey A. Gaffin
*Assistant Examiner*—Ronald W. Leja
*Attorney, Agent, or Firm*—Terje Gudmestad; Michael W. Sales

[57] ABSTRACT

An overcurrent protection circuit for protecting a boost-type non-isolated battery discharge controller from a fault current. The battery discharge controller includes multiple parallel-coupled power stages each having an input fuse and an output fuse having predetermined current ratings. The overcurrent protection circuit includes a resistor serially connected to an input of each of the output fuses of each of the power stages for limiting the fault current through each of the power stages to a predetermined level below the predetermined current ratings of the input and output fuses. The overcurrent protection circuit also includes a current bypass path for providing a current path around the power stages when the fault current exceeds the predetermined current ratings of the input and output fuses.

5 Claims, 2 Drawing Sheets

OVERCURRENT PROTECTION CIRCUITRY FOR NON-ISOLATED BATTERY DISCHARGE CONTROLLER

TECHNICAL FIELD

This invention relates to overcurrent protection circuits for boost-type non-isolated battery discharge controllers having multiple parallel power stages.

BACKGROUND ART

Communications satellites require electric power to function. Most communications satellites use silicon solar cells as a primary energy source and rechargeable batteries for eclipse operations. Batteries are typically either nickel-cadmium (NiCd) or nickel-hydrogen (NiH). If a solar array, battery, and loads operated at the same constant voltage, there would be no need for any power control. All the equipment could simply be wired to the same bus. However, the solar array delivers no power during eclipse, has a higher than usual voltage immediately after eclipse, and has a rather sharp maximum power point of operation. A battery requires different voltages for charging and discharging, has a declining voltage during discharge, and requires control to prevent overcharging or too deep a discharge. The loads on a communications satellite may vary as a function of time and require a variety of voltages, each maintained within specified limits. The function of the power system is to provide the power to all the loads, drawing power from the solar array and the battery as required.

The battery operates in three modes: delivering power to a bus, recharging with power from the solar array, and reconditioning by discharging into a resistive load. A boost discharge architecture is preferred as opposed to a buck discharge architecture in order to maintain a low battery cell count. A lower battery cell count generally represents a lower cost approach. Boost-type battery discharge controllers are available in many configurations. One such configuration includes multiple parallel power stages coupled between the battery and the power bus. This configuration can be one of two types, isolated or non-isolated. A typical isolated battery discharge controller having multiple parallel power stages includes a transformer and an input and output fuse in each power stage. The isolated power stages provide a controllable current limit that is safe for the output fuse utilizing cycle-by-cycle current limiting in each power stage. The disadvantages of an isolated power stage, however, is that it is a more complex topology, has a higher cost and weight, and exhibits inherent loss due to lower conversion efficiency of the transformer.

A prior art non-isolated battery discharge controller is shown in FIG. 1, as disclosed in U.S. Pat. No. 5,122,728, issued to Ashley and entitled "Coupled Inductor Type DC to DC Converter With Single Magnetic Component," which is hereby incorporated by reference. To allow for fault isolation from the battery 12 and the regulated power bus 14 in the event of a short to ground of a single load 15, each power stage 16 includes a first fuse 18 at the battery input and a second fuse 20 at the bus output. However, in the event of a short circuit (or fault) to ground on the output of the bus 14, the first and second fuses 18, 20, respectively, present a problem since the current flow to clear the fault must flow from the battery 12 through the discharge controller power stages 16. The fault current may be significantly higher than the total current rating of the fuses 18, 20. Thus, the fuses 18, 20 may be stressed and/or blown before the fault is cleared resulting in damage to the power stages 16 and failure in clearing of the fault. A fault may be cleared if a sufficient amount of current flows through the power stages 16 for a sufficient amount of time so that the fault blows open.

Thus, a need exists for a light weight, low cost, low complexity overcurrent protection circuit for a boost-type battery discharge controller having multiple parallel power stages.

DISCLOSURE OF THE INVENTION

It is a general object of the present invention to provide an overcurrent protection circuit for a boost-type battery discharge controller having multiple non-isolated parallel power stages.

In carrying out the above object and other objects, features, and advantages of the present invention, an overcurrent protection circuit is provided. The circuit includes a resistor serially connected to an input of an output fuse provided in each power stage of a battery discharge controller. The circuit also includes a bypass diode path connected in parallel to the power stages.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
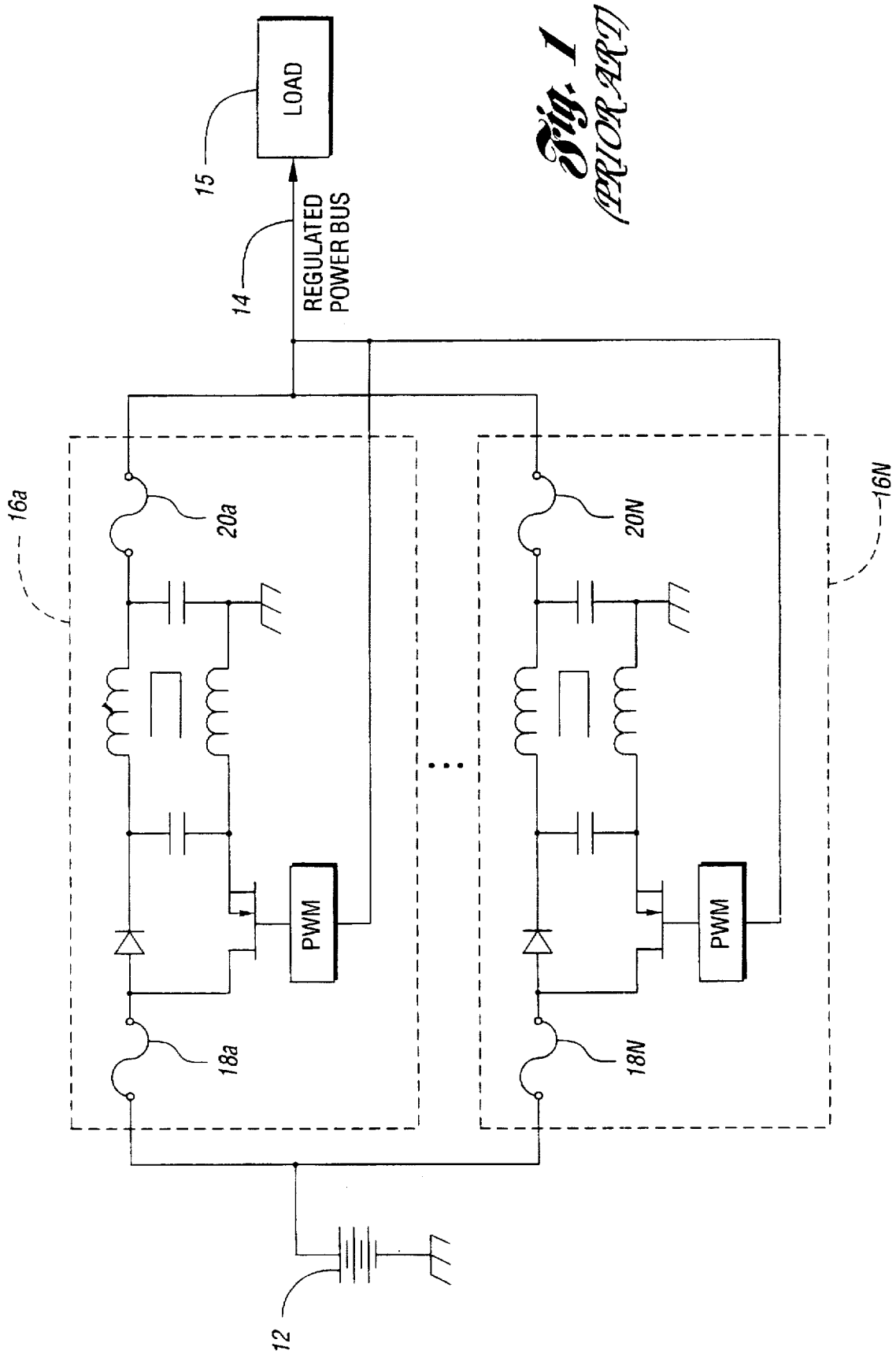
FIG. 1 is a schematic diagram of a prior art boost-type non-isolated battery discharge controller having multiple parallel power stages.
Figure 2:
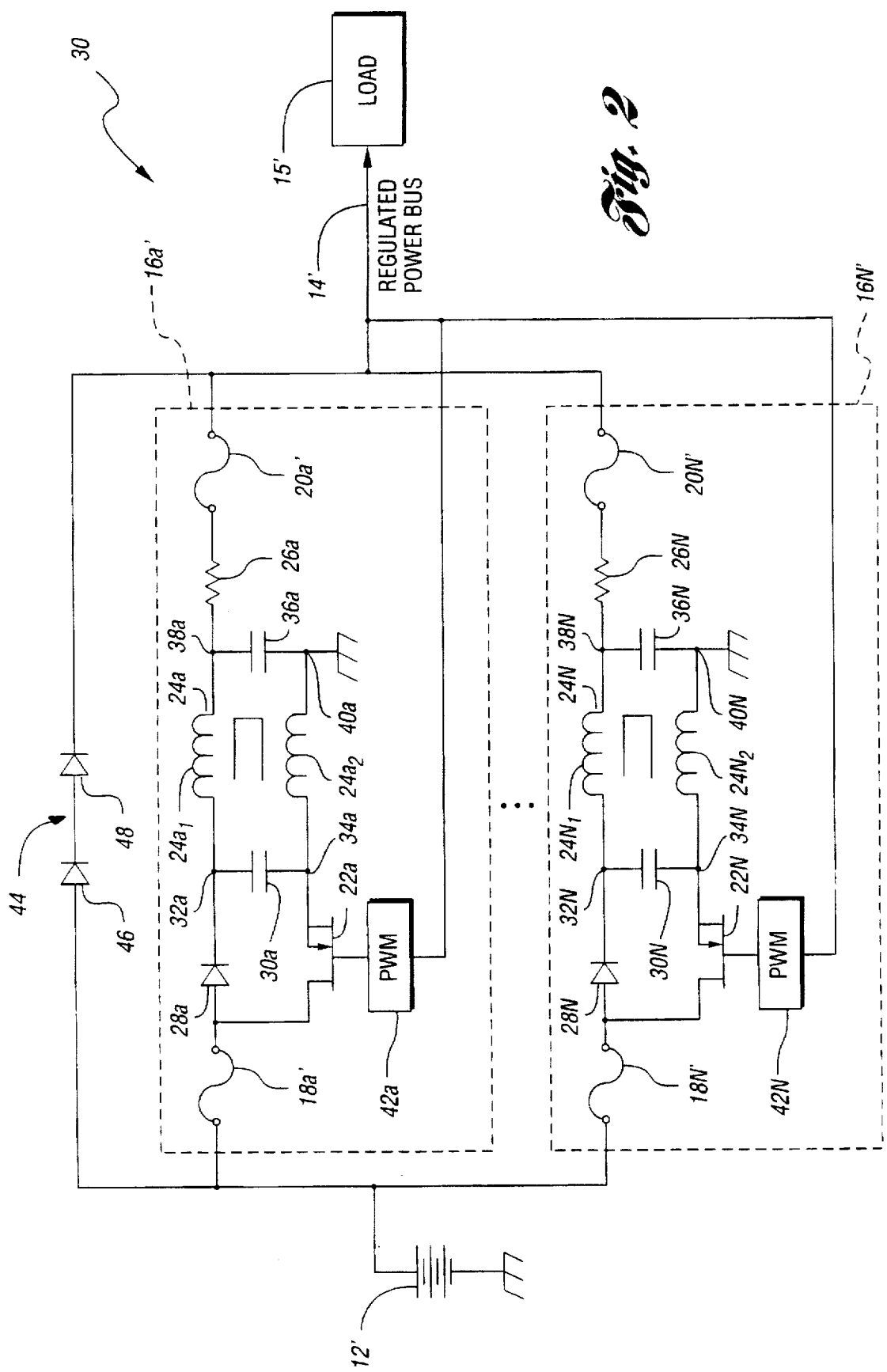
FIG. 2 is a schematic diagram of an overcurrent protection circuit for a boost-type non-isolated battery discharge controller having multiple parallel power stages according to the present invention.

Turning now to FIG. 2, there is shown an overcurrent protection circuit, denoted generally by reference numeral 30, for a boost-type non-isolated battery discharge controller having multiple parallel power stages. The battery discharge controller shown in FIG. 2 is of the type disclosed in U.S. Pat. No. 5,122,728, issued to Ashley and entitled "Coupled Inductor Type DC to DC Converter With Single Magnetic Component." The circuit 30 of the present invention is not limited to the boost-type controller shown in FIG. 2, thus, other boost-type configurations may be utilized.

The circuit 30 of the present invention includes a battery 12', a plurality of power stages 16', and a regulated power bus 14'. The battery 12' is preferably a multicell battery providing DC input voltage in the range of 30–60 VDC. Furthermore, the battery 12' preferably has a first and second terminal. The first terminal is coupled to each of the power stages 16a'–16N'. The second terminal provides ground potential.

Each of the power stages 16a'–16N' include a first fuse 18' coupled in parallel to the first terminal of the battery 12' and a second fuse 20' coupled to the regulated power bus 14'. The first and second fuses 18', 20', respectively, provide fault isolation from the battery 12' and the regulated power bus 14' when a power stage 16a'–16N' experiences an internal short to ground. Each of the power stages 16a'–16N' also includes a power switch 22 for converting the DC input voltage to an AC quasi-square wave. The power switch 22 is preferably a power MOSFET device.

A coupled inductor generally designated 24 comprises windings $24_1$ and $24_2$. One side of the winding $24_1$ is connected to the regulated power bus 14' through a resistor 26 and the second fuse 20' while the other side is connected to the battery 12' through the first fuse 18' and a diode 28. One side of the winding $24_2$ is connected to ground while the other side is connected through the power switch 22 to the battery 12'. An auxiliary winding (not shown) may be used to cancel input ripple current and would be connected in series with an inductor (not shown) and a dc blocking capacitor (not shown) between the battery 12' and ground. A level shifting winding (not shown) may be used to drive the floating power switch 22 from a ground-referenced pulse width modulator (PWM) 42.

An energy transfer capacitor 30 is connected between a junction 32 and a junction 34. An output capacitor 36 is connected between a junction 38 and a junction 40.

The coupled-inductor boost-type battery discharge controller of the present invention uses fixed frequency pulse-width modulation to regulate output voltage at a constant value over a relatively wide range of input voltage and output current. The pulse width modulator 42 includes a first terminal coupled to the regulated power bus 14' and a second terminal coupled to a base of the power switch 22 and controls the duty cycle of the power switch 22 from 0% to 70% to maintain the regulated bus voltage 14.

The overcurrent protection for the boost-type discharge controller discussed above comprises the resistor 26 added in series to the second fuse 20' and a bypass diode path 44 coupled in parallel to the multiple parallel power stages 16a'–16N'. The bypass diode path 44 consists of two series connected diodes 46, 48 which allow fault current to flow from the battery. The two series connected diodes 46,48 are used to provide protection from a single diode short circuit failure that would result in permanent connection of the battery 12' and the regulated power bus 14'. The current through the power stages 16a'–16N' is thus limited by the series resistor 26 so as to protect the first and second fuses 18', 20', respectively. The series resistor 26 limits the current through each of the power stages 16a'–16N' according to the following:

$$I_{stage}(\max) = \frac{V_{bypass}(\max) - V_R(\min)}{R}$$

where $I_{stage}(\max)$ represents the maximum current through each of the individual power stages 16a'–16N'; $V_{bypass}$ represents the voltage drop across the bypass diodes 46, 48; $V_R$ represents the voltage drop across the diode 28 of each power stage 16'; and R is the value of the series resistor 26.

The value of the first and second fuses 18', 20', respectively, is chosen so that the fault current flowing through each of the power stages 16' is below the current rating of the respective fuse 18', 20'. The maximum fault current is a function of the voltage and the resistance of the battery 12'. The majority of the fault clearing current then flows through the series bypass diodes 46, 48 which are selected for high surge current capability. Also, the bypass diodes 46, 48 need not be fast switching diodes, which allows for selection of diodes with low forward voltage drop.

While the best modes for carrying out the invention have been described in detail, those familiar with the art to which this invention relates will recognize various alternative designs and embodiments for practicing the invention as defined by the following claims.

What is claimed is:

1. An overcurrent protection circuit for protecting a boost-type non-isolated battery discharge controller from a fault current, the battery discharge controller having multiple parallel-coupled power stages, each power stage having an input and an output and an input fuse coupled to the input and an output fuse coupled to the output, each of the fuses having predetermined current ratings, the circuit comprising:

a resistor serially connected to an input of each of the output fuses of each of the power stages for limiting the fault current through each of the power stages to a predetermined level below the predetermined current ratings of the input and output fuses; and a current bypass path connected in parallel with the input and the output of each of the power stages for providing a current path around the power stages when the fault current exceeds the predetermined current ratings of the input and output fuses.

2. The overcurrent protection circuit as recited in claim 1 wherein the current bypass path includes two diodes connected in series.

3. The overcurrent protection circuit as recited in claim 1 wherein each of the multiple parallel-coupled power stages include a single diode coupled to the output of the input fuse and wherein a value of the resistor, R, is chosen in accordance with the following:

$$I_{stage}(\max) = \frac{V_{bypass}(\max) - V_R(\min)}{R}$$

where $V_{bypass}(\max)$ represents a maximum voltage drop across the current bypass path; $V_R(\min)$ represents a minimum voltage drop across the single diode; and $I_{stage}(\max)$ represents a maximum current through each of the power stages.

4. An overcurrent protection circuit for protecting a boost-type non-isolated battery discharge controller from a fault current, the battery discharge controller having multiple parallel-coupled power stages, each power stage having an input and an output and an input fuse coupled to the input and an output fuse coupled to the output, each of the fuses having predetermined current ratings, the battery discharge controller further including a single diode coupled to an output of each of the input fuses, the circuit comprising:

a resistor serially connected to an input of each of the output fuses of each of the power stages for limiting the fault current through each of the power stages to a predetermined level below the predetermined current ratings of the input and output fuses, and wherein a value of the resistor, R, is chosen in accordance with the following:

$$I_{stage}(\max) = \frac{V_{bypass}(\max) - V_R(\min)}{R}$$

where $V_{bypass}(\max)$ represents a maximum voltage drop across a current bypass path; $V_R(\min)$ represents a minimum voltage drop across the single diode; and $I_{stage}(\max)$ represents a maximum current through each of the power stages; and the current bypass path connected in parallel with the input and the output of each of the power stages for providing a current path around the power stages when the fault current exceeds the predetermined current ratings of the input and output fuses.

5. The overcurrent protection circuit as recited in claim 4 wherein the current bypass path includes two diodes connected in series.

* * * * *